Oct. 9, 1951 A. J. WEATHERHEAD, JR 2,570,506
FILLER SPOUT PROTECTIVE AND SEALING ARRANGEMENT
FOR VEHICLE LUGGAGE COMPARTMENTS
Filed March 12, 1949 2 Sheets-Sheet 1

INVENTOR.
ALBERT J. WEATHERHEAD, JR
BY Richey + Watts
ATTORNEYS.

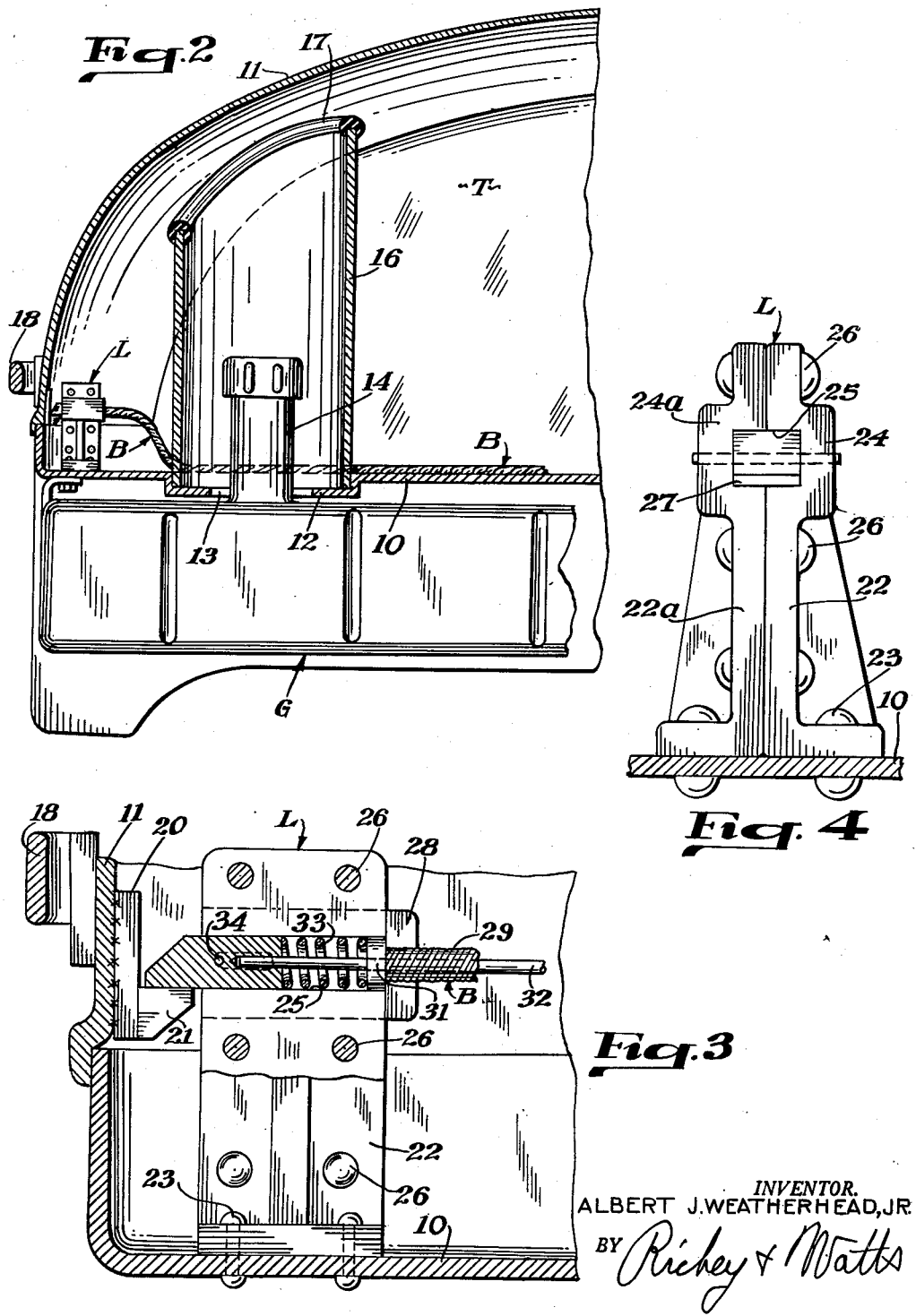

Patented Oct. 9, 1951

2,570,506

UNITED STATES PATENT OFFICE 2,570,506

FILLER SPOUT PROTECTIVE AND SEALING ARRANGEMENT FOR VEHICLE LUGGAGE COMPARTMENTS

Albert J. Weatherhead, Jr., Shaker Heights, Ohio, assignor to The Weatherhead Company, Cleveland, Ohio, a corporation of Ohio Application March 12, 1949, Serial No. 81,046

3 Claims. (Cl. 296—37)

This invention relates to vehicles and more particularly to a novel trunk or baggage compartment that can be locked to prevent theft of articles therefrom, and also to prevent unauthorized access to filling spout for the fuel tank of the vehicle.

It is an object of the invention to prevent unauthorized access to the gas filler spout as well as to the trunk or luggage compartment of the vehicle without requiring a plurality of locking devices therefor. Briefly, this is accomplished by extending the filler spout into the luggage compartment of the vehicle and providing a lock or latch means for the luggage compartment so that when the lid thereof is locked by the owner, unauthorized access to the interior of the luggage compartment and to the filler spout is prevented.

Another object resides in protection of the filler spout within the trunk from damage caused by articles that might be carried in the trunk. This is accomplished in a preferred form of the invention by surrounding the filler spout with a suitable guard or tubular member which protects it from mechanical damage within the trunk.

Still another object is the prevention of the escape of fuel vapors from the tank into the interior of the trunk and to the vehicle body when the lid is closed, and to provide for the escape or venting of such vapors to the atmosphere externally of the vehicle body. These objects are accomplished by forming the guard member for the filler spout as a generally tubular member that surrounds the spout and makes a fluid-tight seal with the lid of the luggage compartment when the lid is closed. Such a seal prevents the escape of fumes into the vehicle body, and suitable vents are provided in the floor of the trunk within the guard member so that the fuel vapors may be vented externally of the body.

Another object resides in improvement of the design and appearance of the rear quarter section of the body, the simplification of the construction and reduction in the cost of manufacture of the body, and protection of the body finish from gasoline fumes and overflow during filling. The extension of the fuel-tank filler spout through the floor of the trunk eliminates the need for a door or spout in the rear fender. This removes danger of gasoline contact with the fender and body during a tank filling operation as well as the necessity for making a neat joint between the spout and the fender or body. Thus, a vehicle equipped in accordance with the invention appears symmetrical and has a cleaner appearance without sacrificing the accessibility of the spout under authorized conditions. In order that access may be had to the spout without requiring the driver to leave the driver's seat and in order to further dress up and simplify the construction and appearance of the vehicle, I provide an internal latch for the lid of the trunk and remote control means therefor operable from the driver's seat. Thus, a single latch serves the double function of protecting both the trunk and the filler spout, and, not only is the appearance of the car improved by placing the filler spout within the trunk, but the handle for the trunk may be simplified and made neater in appearance because no external locking means need be incorporated therein.

The manner in which the aforesaid objects are accomplished will be readily understood from the following detailed description of a preferred embodiment of my invention.

In the drawings:

Fig. 2 is a fragmentary section showing more clearly the disposition of certain parts; and, Figs. 3 and 4 are enlarged views showing one form of latch mechanism that may be employed in the invention.

Figure 1:
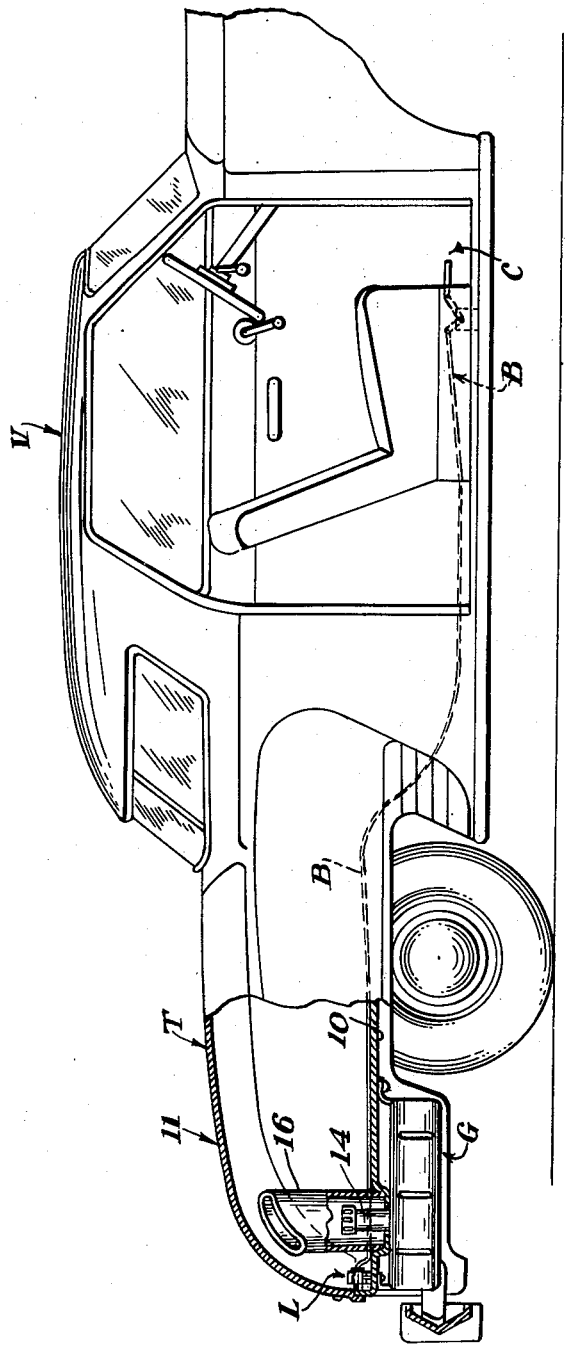
Fig. 1 shows a typical installation in a passenger vehicle.

The vehicle V as shown is a typical example of a gasoline powered passenger car, and in accordance with conventional practice includes a commodious rear trunk or luggage compartment T. The floor 10 of the trunk forms a platform for supporting luggage and the like, and the usual lid 11 is forwardly hinged to the body and acts as a closure for the trunk. In the preferred construction, a portion of floor 10 is depressed as at 12 and apertured as at 13 for reception of the filling spout 14 of the fuel tank G, the latter being suspended by any suitable means from the chassis or body of the vehicle. In order to protect the spout 14 from damage and to seal the vapors from the interior of the trunk T, a tubular sleeve member 16 is welded or otherwise fastened within the depression 12 of the floor and extends upwardly, terminating in a sealing lip 17 preferably of rubber-like material. The upper end of the tubular member 16 is contoured and configured so that it makes a gas-tight seal with the lid of the trunk when the lid is lowered to its closed position. Thus, member 16 acts as a combined guard for the spout and an enclosure therefor that prevents gasoline vapors from flowing into the compartment when the lid is closed.

Latch means internal to the trunk and operable from the driving compartment of the vehicle are provided. For example, a latch L may be mounted adjacent the rearward portion of the trunk for retaining and locking the lid in its closed position. Although the exact details of the latch construction are not critical to the invention, they comprise mounting plate 20 welded or otherwise fastened to the trunk 11 and carrying the retaining lug or striker 21. Opposed brackets 22 and 22a which may be bent up of heavy sheet metal are fastened or riveted to the trunk floor 10 as at 23 and are bent as at 24 to provide a socket 25. The brackets are fastened together by rivets or other means as at 26 and a bolt 27 is slidably mounted in the socket 25. Portions of the brackets may be bent over as at 28 to retain the latch bolt in a Bowden wire assembly B which is the preferred form of latch operating means. The coiled wire housing 29 for the Bowden wire assembly may be brazed or otherwise attached to flange 31 resting within the socket 25. The operating wire 32 may extend into a suitable bore in the latch 27 and be brazed or otherwise fastened thereto. Spring 33 urges the bolt to its extended position. In order to limit extension of bolt 27, a cross pin 34 may be mounted therein which rides in suitable slots formed in brackets 22 and 22a.

As seen in Fig. 1, the Bowden wire B is extended forwardly and arranged for operation by the control lever C. This lever is preferably positioned to the left of the driver's seat and may comprise a pivotally mounted bell crank, one end of which connects to the wire 32 and the other end of which extends for manipulation by the operator. Of course, the details of the Bowden wire operating mechanism are not critical to the invention and plunger-type controls on the dash may be employed without departing from the mode of operation.

With the construction shown, unauthorized access to the filler spout is prevented unless the control lever is manipulated which may be done by the driver without leaving the vehicle. Of course, when the vehicle is parked the doors may be locked to prevent access to control lever C. Since the filler spout extends upwardly into the trunk, the expensive curved pipe normally leading to the body or fender and the unsightly and expensive rubber seal between the body and the pipe may be omitted. This simplifies the construction of the body and improves its appearance.

When the lid is closed no gasoline vapors may flow into the body or trunk because of the sealing member 17. Rather, they are vented by the clearance between bore 13 and spout 14. Thus, with the construction made in accordance with the invention, a single trunk latch serves the dual purpose of preventing access to the trunk interior as well as to the gasoline filler spout, and, in addition, permits savings in the construction of the body and improvement in its appearance.

Although the Bowden wire construction is a simple and dependable means for operating the latch, it will be understood that within the scope of the invention, other well-known remote control operators may be employed to attain the advantages of the preferred embodiment.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

Having thus described the present invention so that others skilled in the art may be able to understand and practice the same, I state that what I desire to secure by Letters Patent is defined in what is claimed.

What is claimed is:
1. In combination in a vehicle, a vehicle body having formed therein a luggage compartment having a luggage confining and supporting wall and a lid, a fuel tank carried by said vehicle outside said compartment, an aperture in the wall of said compartment, a filler spout extending from said fuel tank and through said aperture, conduit means for surrounding said spout, said conduit means being in fluid-tight engagement with the wall of said compartment and with said lid when the lid is closed to seal the filler spout from the interior of the compartment, said conduit means including a yielding section to facilitate maintenance of said fluid-tight seal with the lid closed, vent means in said body leading from the atmosphere to the interior of said conduit means with the lid closed, and a lock for the lid of said compartment to prevent unauthorized access to said filler spout.

2. In combination in a vehicle, a vehicle body having formed therein a luggage compartment, a lid member for said compartment, a fuel tank carried by said vehicle outside said compartment, an aperture in the floor of said compartment, a filler spout extending from said fuel tank and through said aperture, a conduit member surrounding said spout and extending between the floor and the lid member of the compartment with the lid member closed, said conduit member being in sealed relationship with the floor of said compartment, vent means formed in the floor of said compartment within said conduit member, resilient means on one of said members for sealingly engaging the other member when the lid member is closed whereby said lid member acts as a closure for one end of said conduit member, and a lock for the lid of said compartment.

3. In combination in a vehicle, a vehicle body having formed therein a luggage compartment, a lid for said compartment, a fuel tank carried by said vehicle outside said compartment, an aperture in the floor of said compartment, a filler spout extending from said fuel tank and through said aperture, a conduit member surrounding said spout and extending between the floor and the lid member of the compartment with the lid member closed, said conduit member being in sealed relationship with the floor of said compartment and having an open upper end, vent means formed in the floor of said compartment within said conduit member, gasket means on the upper end of said conduit member for sealingly engaging the lid when the latter is closed, and a lock for the lid member of said compartment.

ALBERT J. WEATHERHEAD, Jr.

REFERENCES CITED

The following references are of record in the file of this patent:

UNITED STATES PATENTS

| Number | Name | Date |
|---|---|---|
| 2,035,895 | Kelly | Mar. 31, 1936 |
| 2,155,147 | Nelson | Apr. 18, 1939 |
| 2,335,058 | Halenberger | Nov. 23, 1943 |
| 2,352,929 | Worgess | July 4, 1944 |
| 2,508,124 | Stephenson | May 16, 1950 |

FOREIGN PATENTS

| Number | Country | Date |
|---|---|---|
| 431,604 | Great Britain | July 11, 1935 |
| 777,507 | France | Nov. 26, 1934 |